United States Patent [19]

Kamei

[11] Patent Number: 5,717,786
[45] Date of Patent: Feb. 10, 1998

[54] APPARATUS FOR DETERMINING RIDGE DIRECTION PATTERNS

[75] Inventor: Toshio Kamei, Tokyo, Japan

[73] Assignee: NEC Corporation, Tokyo, Japan

[21] Appl. No.: 455,689

[22] Filed: May 31, 1995

[30] Foreign Application Priority Data

Jun. 21, 1994 [JP] Japan ................. 6-138833

[51] Int. Cl.⁶ .................. G06K 9/46; G06K 9/00; G06K 9/40; G06K 9/48
[52] U.S. Cl. ............... 382/204; 382/125; 382/201; 382/199; 382/266
[58] Field of Search .................... 382/125, 124, 382/113, 116, 193, 199, 204, 266, 201

[56] References Cited

U.S. PATENT DOCUMENTS

| | | | |
|---|---|---|---|
| 4,047,154 | 9/1977 | Vitols et al. | 340/146.3 E |
| 4,896,363 | 1/1990 | Taylor et al. | 382/125 |
| 5,140,642 | 8/1992 | Hsu et al. | 382/124 |
| 5,164,992 | 11/1992 | Turk et al. | 382/118 |
| 5,189,708 | 2/1993 | Cox et al. | 382/143 |
| 5,233,670 | 8/1993 | Dufour et al. | 382/197 |
| 5,259,040 | 11/1993 | Hanna | 382/107 |
| 5,426,708 | 6/1995 | Hamada et al. | 382/125 |
| 5,483,462 | 1/1996 | Chiang | 369/492 |
| 5,497,429 | 3/1996 | Shibuya | 382/125 |
| 5,519,785 | 5/1996 | Hara | 382/124 |
| 5,524,161 | 6/1996 | Omoni et al. | 382/125 |

FOREIGN PATENT DOCUMENTS

| | | | |
|---|---|---|---|
| 0 466 039 | 1/1992 | European Pat. Off. | G06K 9/46 |
| 2 582 831 | 12/1986 | France | G06K 9/62 |
| 63-308679 | 12/1988 | Japan | G06F 15/62 |

*Primary Examiner*—Leo Boudreau
*Assistant Examiner*—Bipin Shalwala
*Attorney, Agent, or Firm*—Foley & Lardner

[57] ABSTRACT

From an image memory of a fingerprint picture, gradient vectors of the picture are calculated. And from distribution of gradient vectors in a subregion, ridge direction of the subregion are determined, and confidence of the determined direction is also defined.

6 Claims, 5 Drawing Sheets

APPARATUS FOR DETERMINING RIDGE DIRECTION PATTERNS

BACKGROUND OF THE INVENTION

This invention relates to an apparatus for determining ridge direction patterns which are used for fingerprint verification or palmprint verification.

Ridge direction patterns are important for fingerprint classification and verification, and a various kind of apparatus for determining ridge direction patterns has been proposed. But, in general, complicated processing and a large amount of operations are required in heretofore known apparatus for determining ridge direction patterns.

As an example of a heretofore known apparatus, a Japanese patent application entitled "Apparatus for detecting ridge direction patterns" and laid open as a provisional publication No. 308679/'88 is briefly described in connection with FIG. 10.

Suppose that 101 in FIG. 10 represents a fingerprint image in a subregion around a sample point. And suppose that there are 8 (eight) quantized directions from 0° to 180°. A direction of 180°+α is, in this definition, equal to a direction of α.

Thus, d1(102) in FIG. 10 is a direction of 0°, d2(103) is a direction of 22.5°, and d3(104) is a direction of 45°. The fingerprint image 101 is scanned on 12(twelve) equally spaced lines parallel to the directions d1, d2, d3 respectively. Data of pixels on each scanning line are aggregated, and the total sum is represented by a length of a bar on the scanning line, as shown in bar graphs of 105, 106, 107. The direction d1(102) is nearly perpendicular to ridge directions, and almost all the scanning lines cross almost all the ridge lines, averaging the length of the bars. The direction d3(104) is nearly parallel to the ridge directions, and some scanning line runs on a ridge line making a large aggregated sum, and some scanning line runs on a space between two ridge lines making a small aggregated sum.

When the bar graphs of all the eight directions are completed, difference between the highest bar and the lowest bar in a direction is calculated. The direction wherein the difference between the highest bar and the lowest bar is maximum is determined as the quantized ridge direction of the subregion.

From the foregoing descriptions, it will be easily understood that the heretofore known process is complicated and requires a large amount of operations. When number of quantization levels is increased, the amount of operations must be increased. For example, when number of quantized directions is increased from 8 to 16 directions in 0°~180°, the amount of operations must be doubled.

Usually, degree of trustworthiness, that is confidence, of the detected direction is also necessary for each determined ridge directions, because the confidence is important for smoothing ridge directions against interfering noises included in a fingerprint image. The heretofore known apparatus requires a complicated processing with a large amount of operations to determine the confidence of a detected ridge direction.

SUMMARY OF THE INVENTION

Therefore, a primary object of the present invention is to supply an apparatus for determining ridge direction patterns precisely by simple processes with small amount of operations.

Another object of the invention is to supply an apparatus for determining ridge direction patterns wherein quantization levels can be increased as desired without additional operations.

Still another object of the present invention is to supply an apparatus for determining ridge direction patterns together with confidence for each determined ridge direction.

These objects of the present invention is achieved by determining ridge direction in a subregion from local distribution pattern of gradient vectors in a fingerprint picture image. A gradient vector of a point is composed of its X-component and Y-component. The X-component is obtained by differentiating the fingerprint picture image in X direction and the Y-component is obtained by differentiating the fingerprint picture image in a Y direction. These differentiation operations are much simpler than the operations described in connection with FIG. 10.

And still another object of the present invention is to decrease noise interference on ridge direction determination from noises included in a fingerprint picture image. In order to achieve the object, the differentiation for determining a gradient vector is performed by a differentiation operator which is determined in accordance with spacing between ridge lines.

Still another object of this invention is to provide an adaptive process for analyzing distribution of gradient vectors and determining ridge directions. For this object, a multiple regression analysis is employed in an embodiment of this invention.

In another embodiment, a principal component analysis is employed for analyzing distribution of gradient vectors.

From a periodicity of a fingerprint pattern, it may be said that average value of gradient vectors in an area which is calculated in a case with using a principal component analysis approaches to 0 when the area is sufficiently large for patterns contained in the area. In an embodiment of this invention, the average value of gradient vectors is assumed to be 0, for the purpose of further simplifying the operation of the principal component analysis.

In analyzing distribution of gradient vectors and determining ridge directions in this invention, probability of trustworthiness of each determined ridge direction is also determined.

BRIEF DESCRIPTION OF THE DRAWINGS

Further objects, features, and advantages of this invention will become apparent from a consideration of the following description, the appended claims, and the accompanying drawings in which the same numerals indicate the same or the corresponding parts.

DETAILED DESCRIPTION OF THE PREFERRED EMBODIMENTS

Figure 1:
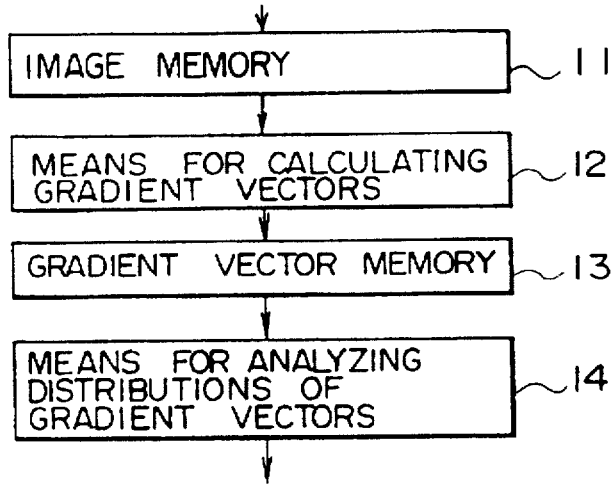
FIG. 1 shows a block diagram of an embodiment of this invention.

Now referring to FIG. 1, an embodiment of this invention comprises an image memory 11 for storing image data of such a skin surface pattern as a fingerprint, means 12 for calculating gradient vectors from the data stored in the image memory 11, a gradient vector memory 13 for storing data of gradient vectors calculated in the means 12 for calculating gradient vectors, and means 14 for analyzing distributions of gradient vectors which determines the distributions of gradient vectors and determines a ridge direction.

For a numerical example, the image memory 11 stores 512×512 pixel data, and a pixel data is denoted by f(x,y) where x, y(x=1, 2, ... 512;y=1, 2, ... 512) are X-address number and Y-address number of the pixel data in the image memory 11, (x, y) corresponding coordinates position of the pixel in the picture.

Figure 9:
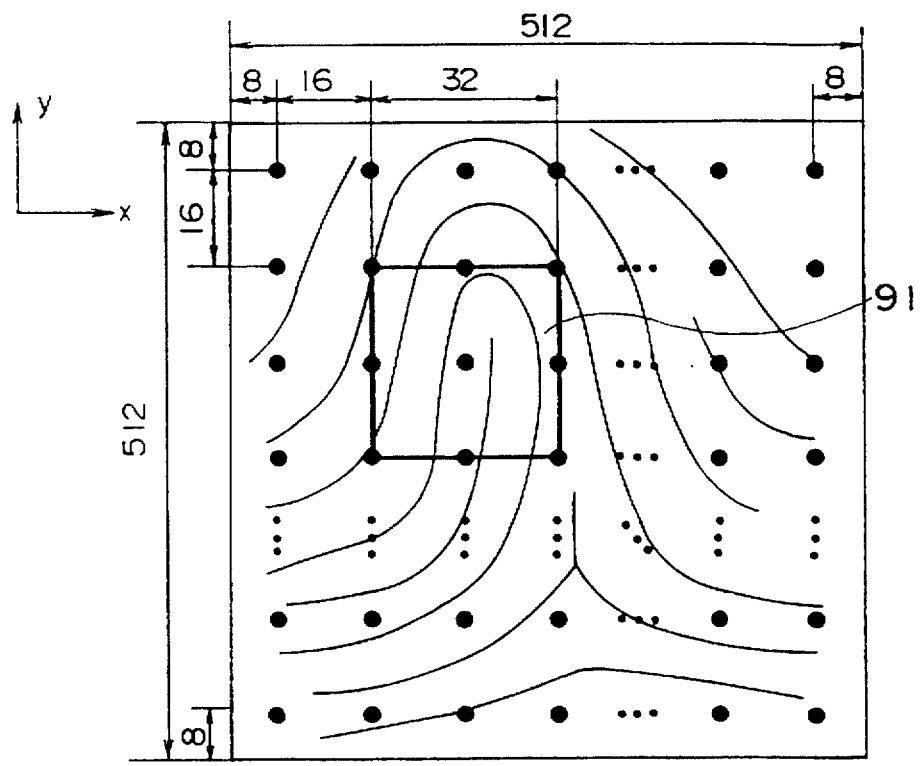
FIG. 9 shows a subregion in a fingerprint picture image.
Figure 10:
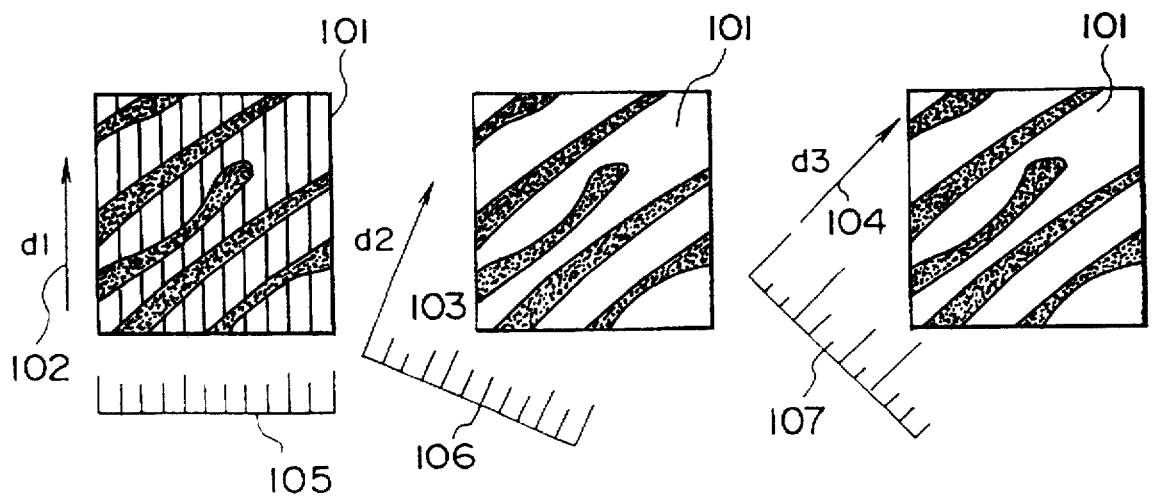
FIG. 10 shows graphs illustrating performances of an apparatus of a prior art.

Referring to FIG. 9, 32×32 sample points are determined as shown by small black circles in FIG. 9. The X-Y address of the sample points are x=8, 24, 40, 56, ... 504; y=8, 24, 40, 56, ... 504. For each sample point (excluding outermost sample points) 32×32 pixel data area including the sample point in the center is determined as a subregion 91. Distributions of gradient vectors are analyzed for each subregion.

Figure 2:
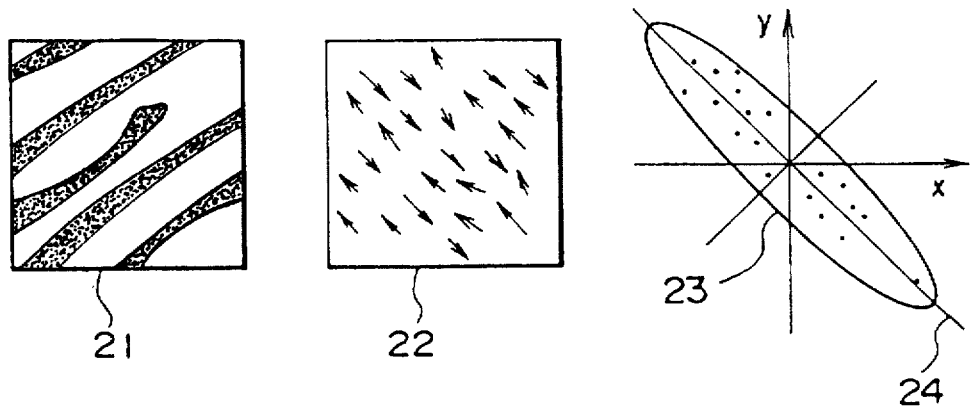
FIG. 2 shows graphs illustrating performances of an apparatus of FIG. 1.

Now referring to FIG. 2, contents of the image memory 11 in a subregion are shown in a picture 21. When these contents is denoted by f(x,y), the gradient is expressed by $$\text{grad} f(x,y) = \begin{pmatrix} f_x(x,y) \\ f_y(x,y) \end{pmatrix} = \begin{pmatrix} \partial f(x,y)/\partial x \\ \partial f(x,y)/\partial y \end{pmatrix} \quad (1)$$

Figure 3:
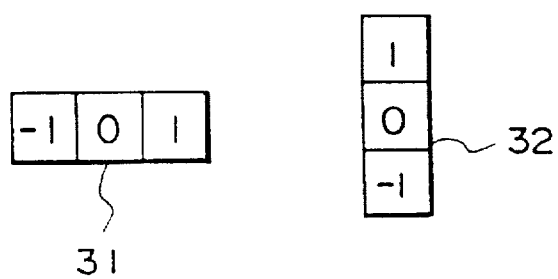
FIG. 3 shows an example of kernels used for differentiation operation in this invention.

Since f(x,y) is a discrete function, the differentiation operation $\partial/\partial x$(in X direction) or $\partial/\partial y$(in Y direction) is performed by calculating convolution between the function f(x, y) and a kernel. There are various types of kernels. In a simplest case, a kernel 31 in FIG. 3 is used for $\partial/\partial x$ and a kernel 32 in FIG. 3 is used for $\partial/\partial y$.

Convolution between the kernels 31, 32 and the function f(x,y) means that $$\partial f(x,y)/\partial x = f(x+1,y) - f(x-1,y)$$

$$\partial f(x,y)/\partial y = f(x,y+1) - f(x,y-1)$$

Figure 8:
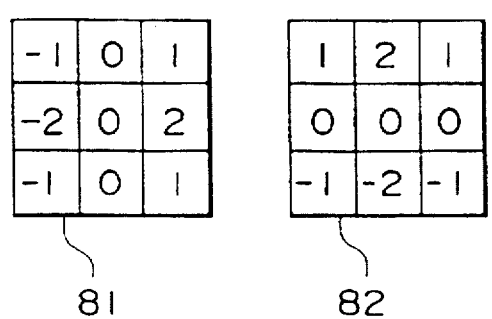
FIG. 8 shows still another example of kernels used for differentiation operation in this invention.

FIG. 8 shows another example of kernels, a kernel 81 in FIG. 8 being used for $\partial/\partial x$ and a kernel 82 in FIG. 8 being used for $\partial/\partial y$.

The gradient vectors thus calculated from the function f(x,y) (shown by 21 of FIG. 2) by means 12 for calculating gradient vectors, are shown by 22 of FIG. 2. These gradient vectors are stored in a gradient vector memory 13.

In an ordinary practice, gradient vectors are calculated for all 512×512 pixels and all the gradient vectors calculated are stored in the gradient vector memory 13. The means 14 for analyzing distributions of gradient vectors selects a subregion where 32×32 gradient vectors are included, and distribution analysis of gradient vectors is performed by multiple regression analysis.

The direction of the principal axis 24 is determined by a multiple regression analysis. At a point "i" in a subregion, components of a gradient vector are assumed $p_i = f_x(x,y)$ and $q_i = f_y(x,y)$. An energy function E(a, b) is expressed by $$E(a,b) = \Sigma_i \| q_i - (ap_i + b) \|^2 \quad (2)$$

a vector $$\begin{pmatrix} a \\ b \end{pmatrix}$$

which minimizes E is obtained to be $$\begin{pmatrix} a \\ b \end{pmatrix} = \begin{pmatrix} \Sigma_i (p_i)^2 \Sigma_i p_i \\ \Sigma_i p_i \Sigma_i 1 \end{pmatrix}^{-1} \begin{pmatrix} \Sigma_i p_i q_i \\ \Sigma_i q_i \end{pmatrix} \quad (3)$$

Value of "a" obtained from the equation(3) represents a direction of the principal axis 24 and the ridge direction $\theta$ of the subregion is obtained from $\theta = \tan^{-1}(-1/a) \ldots$ (4). It must be noted that $\theta$ can be quantized as desired.

Figure 5:
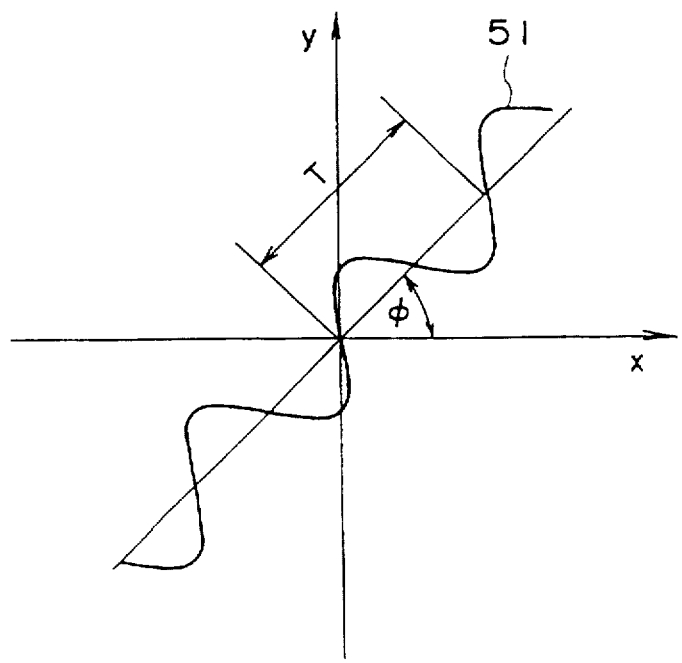
FIG. 5 shows a graph illustrating ridge line pitch.

In some cases, signal to noise ratio of the gradient vectors can be improved when kernels adapted to ridge line pitch are employed for the differentiation operations. Referring to FIG. 5, it is assumed that a plane wave 51 on an x-y plane in a direction $\phi$ with a pitch T represents a ridge line pattern. Detected ridge line pattern f(x,y) can be expressed by $$f(x, y) = \sin(\omega_x x + \omega_y y) + n(x, y) \quad (4)$$

where n(x, y) is a Gaussian noise, and $$\omega = 2\pi/T, \quad \omega_x = \omega \cos\phi, \quad \omega_y = \omega \sin\phi \quad (5)$$

Figure 4:
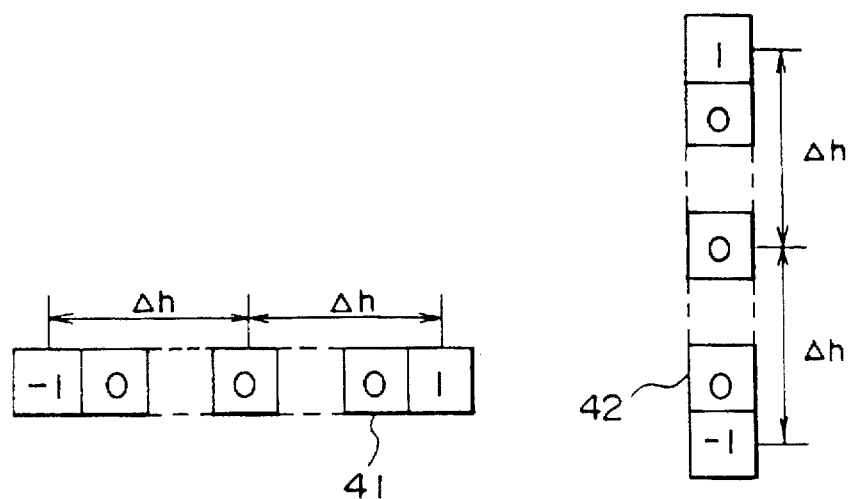
FIG. 4 shows another example of kernels used for differentiation operation in this invention.

FIG. 4 shows a pair of kernels 41, 42 to be used, $\Delta h$ being a parameter to be determined in accordance with the ridge line pattern. When these kernels are used, $$\partial f(x, y)/\partial x = \sin(\omega_x(x+\Delta h) + \omega_y y) + n(x+\Delta h, y) - \sin(\omega_x(x-\Delta h) + \omega_y y) - n(x-\Delta h, y) = \sin(\omega_x x + \omega_y y + \omega_x \Delta h) - \sin(\omega_x x + \omega_y y - \omega_x \Delta h) + n(x+\Delta h, y) - n(x-\Delta h, y) \quad (6)$$

$$\partial f(x, y)/\partial y = \sin(\omega_x x + \omega_y(y+\Delta h)) + n(x, y+\Delta h) - \sin(\omega_x x + \omega_y(y-\Delta h)) - n(x, y-\Delta h) = \sin(\omega_x x + \omega_y y + \omega_y \Delta h) - \sin(\omega_x x + \omega_y y - \omega_y \Delta h) + n(x, y+\Delta h) - n(x, y-\Delta h) \quad (7)$$

Substituting by $\alpha = \omega_x x + \omega_y y$, we obtain $$\partial f(x, y)/\partial x = 2\cos\alpha \sin(\omega_x \Delta h) + n(x+\Delta h, y) - n(x-\Delta h, y) \quad (8\text{-}1)$$

$$\partial f(x, y)/\partial y = 2\cos\alpha \sin(\omega_y \Delta h) + n(x, y+\Delta h) - n(x, y-\Delta h) \quad (8\text{-}2)$$

Thus, $$S = \begin{pmatrix} 2\cos\alpha \sin(\omega_x \Delta h) \\ 2\cos\alpha \sin(\omega_y \Delta h) \end{pmatrix} \quad (9)$$

$$N = \begin{pmatrix} n(x+\Delta h, y) - n(x-\Delta h, y) \\ n(x, y+\Delta h) - n(x, y-\Delta h) \end{pmatrix} \quad (10)$$

represents signal vector and noise vector respectively.

The signal power $\|S\|^2$ is calculated from equation(9)

$$\|S\|^2 = 4\cos^2\alpha [\sin^2(\omega_x \Delta h) + \sin^2(\omega_y \Delta h)] = 4\cos^2\alpha [1 - \cos(\omega_x + \omega_y)\Delta h][\cos(\omega_x + \omega_y)\Delta h] \quad (11)$$

Substituting $\omega_x$ and $\omega_y$ by equation(5), we obtain $$\|S\|^2 = 4\cos^2\alpha [1 - \cos((\cos\phi + \sin\phi)\omega\Delta h) \times \cos((\cos\phi + \sin\phi)\omega\Delta h)] \quad (12)$$

Figure 6:
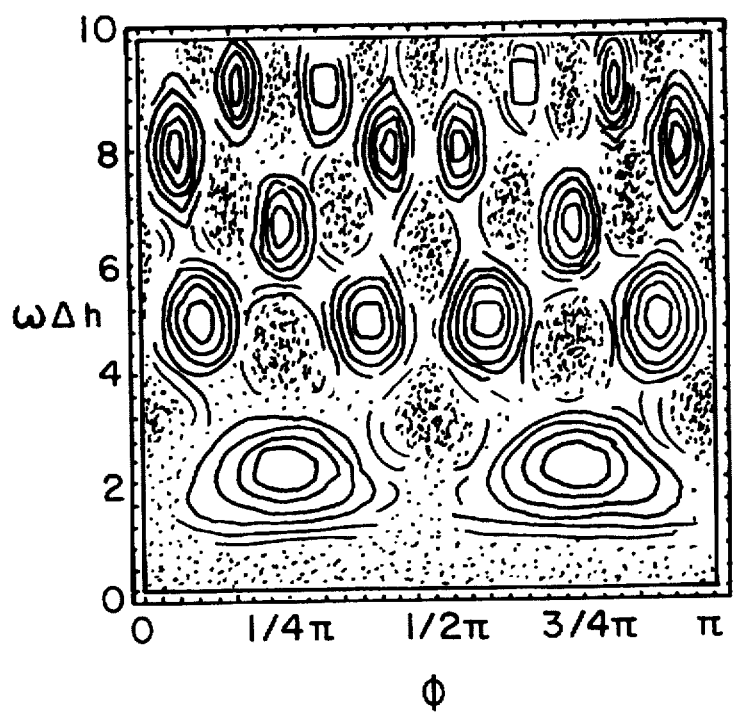
FIG. 6 shows a graph illustrating signal strength by contour lines as a function of ridge line pattern and a parameter for differentiation operation.

FIG. 6 shows $\|S\|^2$ by contour lines as a function of $\phi$ and $\omega\Delta h$. Brighter area means higher signal intensity(of calculated gradient). On the other hand, $\|N\|^2$ is independent of $\phi$ and $\omega\Delta h$, when the noise is a Gaussian noise. Therefore, when $\|S\|^2$ is increased, the signal to noise ratio is increased. It is apparent from FIG. 6 that $\omega\Delta h=1.0$–$2.0$ will give a best result wherein $\|S\|^2$ is high and less independent of $\phi$.

$$\omega\Delta h = 1.0\text{--}2.0 \tag{13}$$

means that $$\Delta h = 1.0/\omega\text{--}2.0/\omega \tag{14}$$

and $$\Delta h = T/2\pi\text{--}T/\pi \tag{15}$$

Figure 7:
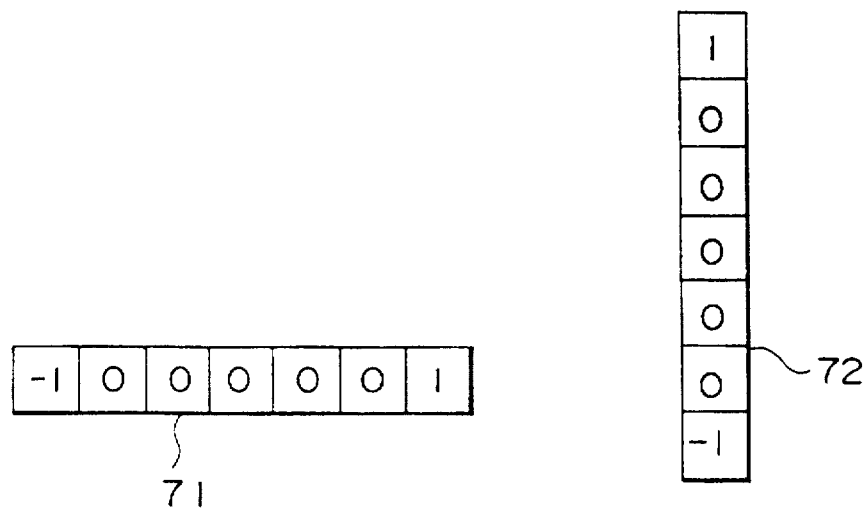
FIG. 7 shows still another example of kernels used for differentiation operation in this invention.

For a numerical example, when a fingerprint image is composed of 20 pixels per mm, a pair of kernels 71 and 72 in FIG. 7 give a best result.

Sometimes a pair of kernels are defined by functions $k_1(x,y)$ and $k_2(x,y)$ in a form $$k_1(x,y) = G(x,y;\sigma_1)\sin(\alpha_1 x) \tag{16}$$

$$k_2(x,y) = G(x,y;\sigma_2)\sin(\alpha_2 y) \tag{17}$$

where G is a Gaussian function, $\sigma_1$, $\sigma_2$, $\alpha_1$, $\alpha_2$ are to be determined experimentally.

For such a pair of kernels, parameters $\alpha_1$, $\alpha_2$ are to be determined in accordance with ridge line pitch T.

In another embodiment of this invention, a principal component analysis is employed as means 14 for analyzing distribution of gradient vectors. When a subregion is denoted by C, variance-covariance matrix of the subregion C is denoted by $$V = \begin{pmatrix} \sigma_{xx} \sigma_{xy} \\ \sigma_{xy} \sigma_{yy} \end{pmatrix} \tag{18}$$

$$\text{where } \sigma_{pq} = \frac{1}{N} \sum_{(x,y)\in C} (f_p(x,y) - \overline{f_p(x,y)})(f_q(x,y) - \overline{f_q(x,y)}) \tag{19}$$

N being total number of gradient vectors in the subregion C, p,q being either one of x or y, and $\overline{f_p(x,y)}$ and $\overline{f_q(x,y)}$ being mean values of $f_p(x,y)$ and $f_q(x,y)$ respectively.

Eigenvalues and eigenvectors of the matrix(18) are obtained as $\lambda_1, \lambda_2$ (eigenvalues and $\lambda_1 > \lambda_2$) and $e_1, e_2$ (eigenvectors, $e_1$ corresponding to $\lambda_1$ and $e_2$ corresponding to $\lambda_2$).

When V is represented by $$V = \begin{pmatrix} a & b \\ b & c \end{pmatrix} \tag{20}$$

$$\lambda_1 = (a+c+d)/2 \tag{21}$$

$$\lambda_2 = (a+c-d)/2 \tag{22}$$

$$d = [(a-c)^2 + 4b^2]^{1/2} \tag{23}$$

$$g_1 = [b^2 + (\lambda_1 - a)^2]^{1/2} \tag{24}$$

$$g_2 = [b^2 + (\lambda_2 - a)^2]^{1/2} \tag{25}$$

$$e_1 = \begin{pmatrix} b \\ \lambda_1 - a \end{pmatrix} / g_1 \tag{26}$$

$$e_2 = \begin{pmatrix} b \\ \lambda_2 - a \end{pmatrix} / g_2 \tag{27}$$

and $$\theta = \arctan[(\lambda_2 - a)/b] \tag{28}$$

$0 \leq \theta < \pi$ represents the ridge direction of the subregion.

As is apparent from equation(19),the variance-covariance matrix of equation(18) is a matrix of 2th moment around the mean values $(\overline{f_x(x,y)}, \overline{f_y(x,y)})$ of gradient vectors.

When C(equation (19)) is sufficiently large, the mean values of the gradient vectors becomes near to a zero vector. This fact is suggested by FIG. 2, where the center of the distribution 23 seems to be at the origin of the X-Y coordinates. When the mean values of the gradient vectors are assumed to be 0, the following equation is obtained;

$$M = NV \tag{29}$$

$$= \begin{pmatrix} \Sigma [f_x(x,y)]^2 \Sigma [f_x(x,y)f_y(x,y)] \\ \Sigma [f_x(x,y)f_y(x,y)] \Sigma [f_y(x,y)]^2 \end{pmatrix}$$

where, $(x,y) \in C$

Operation of the equation (29) is much simpler than that of the equation (18) and can be completed in less time.

In an embodiment of this invention equation (29) is used, and M is represented by $$M = \begin{pmatrix} a & b \\ b & c \end{pmatrix} \tag{30}$$

Then equations (21),(22),(23),(24),(25),(26),(27),(28) can be applied also for M, and $\theta$ is obtained for the matrix M.

In this invention, confidence of $\theta$ of a subregion is easily determined. Returning to FIG. 2, a distribution of gradient vectors in a subregion is shown by an ellipse 23, and the direction of the principal axis 24 determines $\theta$ of the subregion. The length of the minor axis corresponds to deviation from $\theta$. When noise or other interferences are superimposed on the fingerprint image, the length of the minor axis will be increased.

Hence, the confidence of $\theta$ may be represented by a function of $\lambda_1$ and $\lambda_2$ (Equations (21),(22)). For example, the confidence R is defined by $$R = \sqrt{\lambda_1} - \sqrt{\lambda_2} \tag{31}$$

Or when R is to be normalized, R is defined by $$R = [2\sqrt{\lambda_1}/(\sqrt{\lambda_1} + \sqrt{\lambda_2})] - 1 \tag{32}$$

Although only preferred embodiments are described in this specification, it must be understood that there are modifications without departing from the spirit and scope of this invention.

What is claimed is:

1. An apparatus for determining ridge direction patterns comprising:
    an image memory for storing data f(x,y) of an image of a pixel at a coordinates position (x,y) in a picture of a skin surface at a memory address corresponding to said coordinates position (x,y);

means for calculating gradient vectors from data stored in said image memory, X-component and Y-component of said gradient vector at a position (x,y) being $\partial f(x,y)/\partial x$ and $\partial f(x,y)/\partial y$ respectively;

gradient vector memory for storing calculated gradient vectors at memory address corresponding to said position (x,y); and means for analyzing distributions of gradient vectors, wherein a direction perpendicular to a principal axis of said distribution is determined as a ridge direction of a subregion, wherein:

said means for analyzing distributions of gradient vectors calculates said direction of said principal axis of said distribution of said subregion by a multiple regression analysis in which an energy function E(a,b) is defined by $E(a,b)=\Sigma\|q_i-(ap_i+b)\|^2$ where $p_i$ and $q_i$ respectively represent $\partial f(x,y)/\partial x$ and $\partial f(x,y)/\partial y$ at point i in a subregion and $\Sigma$ represents summation for all points i in said subregion; values of variables a,b which minimize said energy function are obtained; and from the value of 'a', said ridge direction of said subregion is determined.

2. An apparatus for determining ridge direction patterns comprising:

an image memory for storing data f(x,y) of an image of a pixel at a coordinates position (x,y) in a picture of a skin surface at a memory address corresponding to said coordinates position (x,y);

means for calculating gradient vectors from data stored in said image memory, X-component and Y-component of said gradient vector at a position (x,y) being $\partial f(x,y)/\partial x$ and $\partial f(x,y)/\partial y$ respectively;

gradient vector memory for storing calculated gradient vectors at memory address corresponding to said position (x,y); and means for analyzing distributions of gradient vectors, wherein a direction perpendicular to a principal axis of said distribution is determined as a ridge direction of a subregion, wherein:

said means for analyzing distributions of gradient vectors calculates said direction by a principal component analysis in which variance-covariance matrix of gradient vectors in said subregion is determined; eigenvalues $\lambda_1$, $\lambda_2$, ($\lambda_1>\lambda_2$) and eigenvectors $e_1$, $e_2$ are determined from said matrix; and from the eigenvalues and eigenvectors, said ridge direction of said subregion is determined.

3. An apparatus for determining ridge direction patterns of claim 2, wherein:

said means for analyzing distributions of gradient vectors calculates said direction by a principal component analysis in which mean values of X-components and Y-components of said gradient vectors in a subregion are assumed to be zero.

4. An apparatus for determining ridge direction patterns of claim 2, wherein:

said means for analyzing distributions of gradient vectors calculates said direction by a principal component analysis in which confidence of a ridge direction of a subregion is determined as a function of said eigenvalues.

5. An apparatus for determining ridge direction patterns of claim 4, wherein:

said confidence R of a ridge direction of a subregion is defined by $R=[2\sqrt{\lambda_1}/(\sqrt{\lambda_1}+\sqrt{\lambda_2})]-1$.

6. An apparatus for determining ridge direction patterns of claim 4, wherein said confidence R of a ridge direction of a subregion is defined by $R=\sqrt{\lambda_1}-\sqrt{\lambda_2}$.

* * * * *